United States Patent
Wystup et al.

(10) Patent No.: US 11,183,959 B2
(45) Date of Patent: Nov. 23, 2021

(54) DEVICE AND METHOD FOR DETERMINATION OF WINDING TEMPERATURE

(71) Applicant: ebm-papst Mulfingen GmbH & Co. KG, Mulfingen (DE)

(72) Inventors: Ralph Wystup, Künzelsau (DE); Philip Kemmet, Heilbronn (DE)

(73) Assignee: ebm-papst Mulfingen GmbH & Co. KG, Mulfingen (DE)

(*) Notice: Subject to any disclaimer, the term of this patent is extended or adjusted under 35 U.S.C. 154(b) by 0 days.

(21) Appl. No.: 16/801,730

(22) Filed: Feb. 26, 2020

(65) Prior Publication Data
US 2020/0280277 A1 Sep. 3, 2020

(30) Foreign Application Priority Data
Feb. 28, 2019 (DE) .................. 102019105081.2

(51) Int. Cl.
*H02P 21/14* (2016.01)
*H02P 21/13* (2006.01)

(52) U.S. Cl.
CPC .............. *H02P 21/14* (2013.01); *H02P 21/13* (2013.01)

(58) Field of Classification Search
CPC ................................ H02P 21/14; H02P 21/18
USPC ................... 318/798, 799, 767, 727
See application file for complete search history.

(56) References Cited

U.S. PATENT DOCUMENTS

| | | | |
|---|---|---|---|
| 8,487,575 B2* | 7/2013 | Yeh .......................... | H02P 6/08 318/471 |
| 9,528,882 B2* | 12/2016 | Senoo ...................... | G01K 7/00 |
| 2015/0381090 A1 | 12/2015 | Henderson et al. | |

FOREIGN PATENT DOCUMENTS

| DE | 102008040725 A1 | 1/2010 |
|---|---|---|
| EP | 2977733 A1 | 7/2014 |

OTHER PUBLICATIONS

Fernando Briz et al, Temperature Estimation in Inverter-Fed Machines Using High-Frequency Carrier Signal Injections, IEEE Transactions on Industrial Applications vol. 44, No. 3, May/Jun. 2008, pp. 799-808 (Year: 2008).*

(Continued)

*Primary Examiner* — David Luo
(74) *Attorney, Agent, or Firm* — Dickinson Wright PLLC

(57) ABSTRACT

The present invention relates to a device for ascertaining the temperature TW of a winding of an induction machine designed with a stator and a rotor, comprising at least a first Kalman filter (K1) to calculate the temperature and a rotary field control for the vector control of the induction machine with at least one id-current controller, which is designed to impose a high-frequency voltage signal (HF) on the winding voltage in order to obtain from this a winding current with a superimposed high-frequency current component for the winding, which is taken to the Kalman filter (K1), the Kalman filter (K1) having a high-frequency model of the motor in order to determine from this the high-frequency resistance of the winding and in turn the winding temperature TW by means of a calculation function.

10 Claims, 1 Drawing Sheet

(56) References Cited

OTHER PUBLICATIONS

Zhi Gao et al, An Adaptive Kalman Filtering Approach to Induction Machine Stator Winding Temperature Estimation Based on a Hybrid Thermal Model, IEEE 40th IAS Annual Meeting Publication on Oct. 2-6, 2005, pp. 2-9 (Year: 2005).*
German Search Report dated Oct. 24, 2019.
Kalman Filter Wikipedia with English translation, https://de.wikipedia.org/w/index.php?title=Kalman-Filter&oldid=184994452.

* cited by examiner

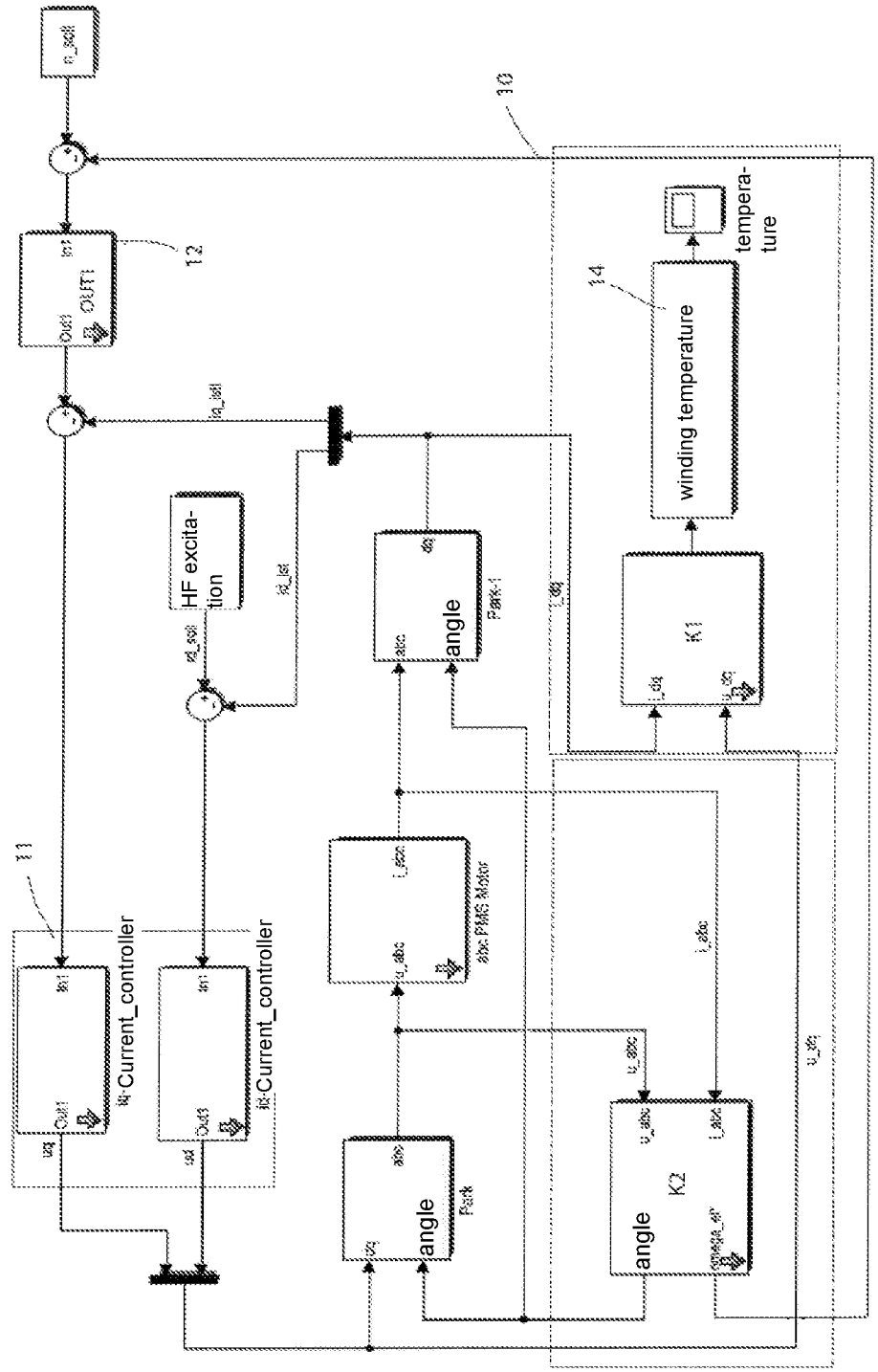

DEVICE AND METHOD FOR DETERMINATION OF WINDING TEMPERATURE

RELATED APPLICATIONS

This application claims priority to German Patent Application No. 10 2019 105 081.2, filed Feb. 28, 2019, the entire contents of which are incorporated herein by reference in their entirety.

FIELD

The invention relates to a device and method for determination of the winding temperature of a motor winding.

BACKGROUND

It is generally known that the motor winding basically becomes heated during the operation of an electric motor, such as a d.c. motor, and therefore special attention must be paid to the heating of the winding under full load operation or under extreme usage conditions. For this purpose, various temperature measuring devices are known.

One possibility of determining the winding temperature consists for example in providing a temperature sensor in the winding and measuring the temperature of the winding directly with it. However, the drawback to this device is that the temperature can only be measured at the place where the measuring probe is situated. This means that local temperature rises in other areas of the winding, or the (overall) averaged temperature (temperature distribution) in the winding cannot be measured.

Another possibility of measuring the winding temperature is to measure the ohmic resistance of the winding and to determine the temperature rise from this measured resistance value and a comparison value, i.e., a resistance value when the winding is in a cold motor. In theory, the winding temperature could be determined by measuring the electric resistance of the exciter winding. However, this only produces satisfactory results in a stationary operation of an externally excited synchronous machine. On the other hand, during dynamic processes, such temperature measurements are distorted so much by armature reactions and currents in attenuator circuits that a practical temperature determination by means of resistance measurements is not possible.

Known methods for temperature determination are the installing of sensors in the winding, the determination of the winding temperature through state estimators (Kalman filters, gradient method) from the motor differential equations, the direct measurement of the winding resistance during operation by coupling in a measurement voltage or the calculation of the motor temperature with the aid of thermal network models of the motor.

From DE 10 2008 040 725 A1 there is known a method for determination of a rotor temperature of a permanently excited synchronous machine in which an estimation value for the rotor temperature is determined by means of a Kalman filter containing a thermal model of the synchronous machine.

From EP 2977733 A1 there is known a further method for determining a winding temperature of an exciter winding of an externally excited synchronous machine by means of a Kalman filter. In this case, a first temperature estimate of the winding temperature is provided for an initial point in time, at various measurement points of time following the initial point in time there are detected an exciter electrical voltage ($u_f(k)$) present on the exciter winding and an exciter electrical current ($i_f(k)$) flowing through the exciter winding, and for each measurement point in time an updated temperature estimate ($x(k)$) is formed recursively in dependence on the exciter voltage ($u_f(k)$) detected at the measurement point in time, the exciter current ($i_f(k)$) detected at the measurement point in time, and a previous temperature estimate ($x(k-1)$).

BRIEF SUMMARY

The solutions known in the prior art make use of the fundamental harmonic model in the Kalman filter and calculate the winding resistance from the manipulated variables of the terminal voltage and the measured amplitude of the winding currents. But since we have discovered that rather inaccurate results are still obtained here and this method based on the fundamental harmonic model is difficult especially in the case of larger motor designs, there is a need for an alternative temperature determination of the winding of an induction machine.

Therefore, the problem which the present disclosure proposes to solve is to overcome the mentioned drawbacks and to indicate an optimized and improved method and a corresponding device for the determination of a winding temperature of a winding of an induction machine.

The problem is solved according to the invention by the features of claim 1.

A fundamental idea of the present disclosure relates to using the skin effect to determine the winding temperature for high-frequency currents.

The skin effect is the attribute of conductors when an alternating current is present whereby only the regions of a conductor near the surface are available for the transporting of the charge carriers. In the case of alternating current, corresponding eddy currents and electric fields are generated, depending on the specific frequency, which displace the charge carriers into the surface of the conductor. The electric fields serve as carriers of energy. But the usable cross section of the conductor for the charge carriers is also reduced, so that the effective resistance of the conductor is increased. Since the resistance itself is a temperature-dependent quantity, there is a direct correlation between the high-frequency resistance of the conductor and the temperature.

According to the present disclosure, there is provided for this a device for ascertaining the temperature TW of a winding of an induction machine designed with a stator and a rotor, comprising at least a first Kalman filter to determine the temperature. For this, first of all a rotary field control for the vector control of the induction machine is provided with at least one id-current controller, which is designed to provide a phase voltage for the winding and to impose a high-frequency voltage signal on the phase voltage in order to obtain from this a winding current with a superimposed high-frequency current component for the winding.

This current with the high-frequency component is taken to the Kalman filter, the Kalman filter provided for this purpose having a model, especially a high-frequency model of the motor, in order to estimate and determine from this the high-frequency resistance of the winding and in turn the winding temperature TW by means of a calculation function.

The classical Kalman filter cannot be used in many instances, since it is limited to linear models of the state space. But the predominant effects here are of a nonlinear nature. Hence, a nonlinear Kalman filter is used with special advantage. For this, one may resort to nonlinear expansions of the Kalman filter, such as the expanded Kalman filter (EKF) or also the unscented Kalman filter (UKF). These Kalman filter variants approximate the nonlinear problem by a linear one, in which either analytical (EKF) or statistical techniques (UKF) are used. In uncomplicated language, these expansions are often also called Kalman filters for short, since they likewise have a recursive and a predictor-corrector structure. By contrast with the simple Kalman filter, a free variable must be used for the Kalman matrix and this must also be estimated each time throughout the use of the filter.

Furthermore, it is advantageously provided according to the invention that the high-frequency Kalman filter is designed to evaluate the specific spectral components in the current signal. Appropriately adapted algorithms may be used for this to realize the corresponding simulation model.

The evaluation precision can be further improved if the winding wire of the winding comprises a thin iron coating or a coating with a high iron content.

In one preferred embodiment of the present disclosure it is further provided that a second Kalman filter is provided, which is designed with a basic motor model to estimate or determine the position of a rotor of the induction machine. In a preferred embodiment, it is provided that the second Kalman filter is adapted to estimate or determine the rotational speed of the rotor of the induction machine.

In a likewise preferred embodiment it is provided that the high-frequency model in the first Kalman filter is modeled in the rotor-fixed system of coordinates.

A further aspect of the present disclosure relates to an induction machine designed with a device as described above for determining the winding temperature.

Yet another aspect of the present disclosure relates to a method for determining the winding temperature of a winding of an induction machine having the following steps:
 a) generating a phase voltage with a superimposed high-frequency voltage component on at least one winding of the induction machine;
 b) taking the phase voltage to at least the input of the first Kalman filter (K1) and determining the difference between the actual phase current and the target phase current in the winding based on the model stored in the Kalman filter (K1);
 c) estimating or determining the high-frequency resistance and
 d) determining the winding temperature from the high-frequency resistance.

It is especially advantageous when the second Kalman filter estimates or determines the rotor position of the rotor and the rotational speed of the induction machine from the difference between the actual phase current and the target phase current in the winding based on the model stored in the second Kalman filter.

Further, it is advantageously provided that the determination of the winding temperature in the aforementioned step d) is done by changing the resistance based on the temperature coefficient of the winding wire of the winding.

BRIEF DESCRIPTION OF THE DRAWINGS

Other advantageous modifications of the invention are characterized in the dependent claims and shall be presented more closely in the following together with the description of the preferred embodiment of the invention with the aid of the FIGURE.

There is shown:
FIG. 1 an exemplary device for the determination of the winding temperature.

DETAILED DESCRIPTION

In the following, the invention shall be explained with reference to FIG. 1, where the FIGURE shows a regulating device 1 comprising the device 10 according to the invention, having two Kalman filters K1, K2.

The regulating device 1 provides a vector control for an induction machine and comprises for this purpose a current controller 11 having the iq-current controller and an id-current controller. A manipulated variable is the target rotational speed n_soll, which is furnished as a controlled variable to the input of the rotational speed controller 12.

The voltage variables uq and ud for the winding are provided at the output of the current controller 11 or the iq-current controller and the id_current controller.

The required control sequence is immediately evident in FIG. 1 and is based on otherwise known techniques and transformations, which therefore are not further explained in the following. The d/q transformation is fundamental for the vector control of rotary current machines and it describes one of several possible space vector representations, such as the equally known Park and inverse Park transformation. Moreover, the two Park transformers Park and Park−1 are shown for the transformation of the corresponding quantities between the space vector representation and the three-axis (abc) representation.

Moreover, the first Kalman filter K1 serves as a resistance estimator in the HF model. For this, the quantities i_dq and u_dq in the space vector representation are furnished to the input of the Kalman filter K1. Based on the stored HF model, the HF resistance is estimated and from this the winding temperature is determined in a calculation module 14 for temperature calculation and put out as the temperature TW.

The second Kalman filter K2 receives, as its input variables, the voltage values u_abc obtained by means of the transformation from the d/q variables and the current values i_abc as the input variables of the values for a PMS motor as the induction machine, shown here as an example. The Kalman filter K2 here operates as an angle estimator for position determination based on a fundamental harmonic model of the PMS motor.

At the output of the Kalman filter K2 there are put out the estimated angle and the rotational speed (omega_el*). The latter is taken as a manipulated variable to the rotational speed controller 12. The position determination is taken to the Park transformer.

The invention claimed is:
1. A device for ascertaining the temperature TW of a winding of an induction machine designed with a stator and a rotor, comprising at least a first Kalman filter (K1) to calculate the temperature and a rotary field control for the vector control of the induction machine with at least one id-current controller, which is designed to impose a high-frequency volt-age signal (HF) on the winding voltage in order to obtain from this a winding current with a superimposed high-frequency current component for the winding, which is taken to the Kalman filter (K1), the Kalman filter (K1) having a high-frequency model of the motor in order to determine from this the high-frequency resistance of the winding and in turn the winding temperature TW by means of a calculation function; wherein the first Kalman filter (K1) is designed to evaluate the specific spectral components in the current signal.

2. The device according to claim 1, wherein the first Kalman filter (K1) is a nonlinear Kalman filter.

3. The device according to claim 1, wherein the winding wire of the winding comprises a thin iron coating or a coating with a high iron content.

4. The device according to claim 1, wherein a second Kalman filter (K2) is provided, which is designed with a motor model to estimate or determine the position of a rotor of the induction machine.

5. The device according to claim 4, wherein the second Kalman filter (K2) is adapted to estimate or determine the rotational speed of the rotor of the induction machine.

6. The device according to claim 1, wherein the high-frequency model in the first Kalman filter (K1) is modeled in the rotor-fixed system of coordinates.

7. An induction machine designed with a device according to claim 1.

8. A method for determining the winding temperature of a winding of an induction machine according to claim 7 having the following steps:
   a) generating a phase voltage with a superimposed high-frequency voltage component on at least one winding of the induction machine;
   b) taking the phase voltage to at least the input of the first Kalman filter (K1) and determining the difference between the actual phase cur-rent and the target phase current in the winding based on the model stored in the Kalman filter (K1);
   c) estimating or determining the high-frequency resistance; and
   d) determining the winding temperature from the high-frequency resistance.

9. The method according to claim 8, wherein the second Kalman filter (K2) estimates or determines the rotor position of the rotor and the rotational speed of the induction machine from the difference between the actual phase current and the target phase current in the winding based on the model stored in the second Kalman filter (K2).

10. The method according to claim 8, wherein the determination of the winding temperature in step d) is done by changing the resistance based on the temperature coefficient of the winding wire of the winding.

* * * * *